Aug. 10, 1937.　　　H. D. GEYER　　　2,089,472
FRICTION CLUTCH
Filed Aug. 1, 1936　　　2 Sheets-Sheet 1

Inventor
Harvey D. Geyer
By Blackmore, Spencer & Flint
Attorneys

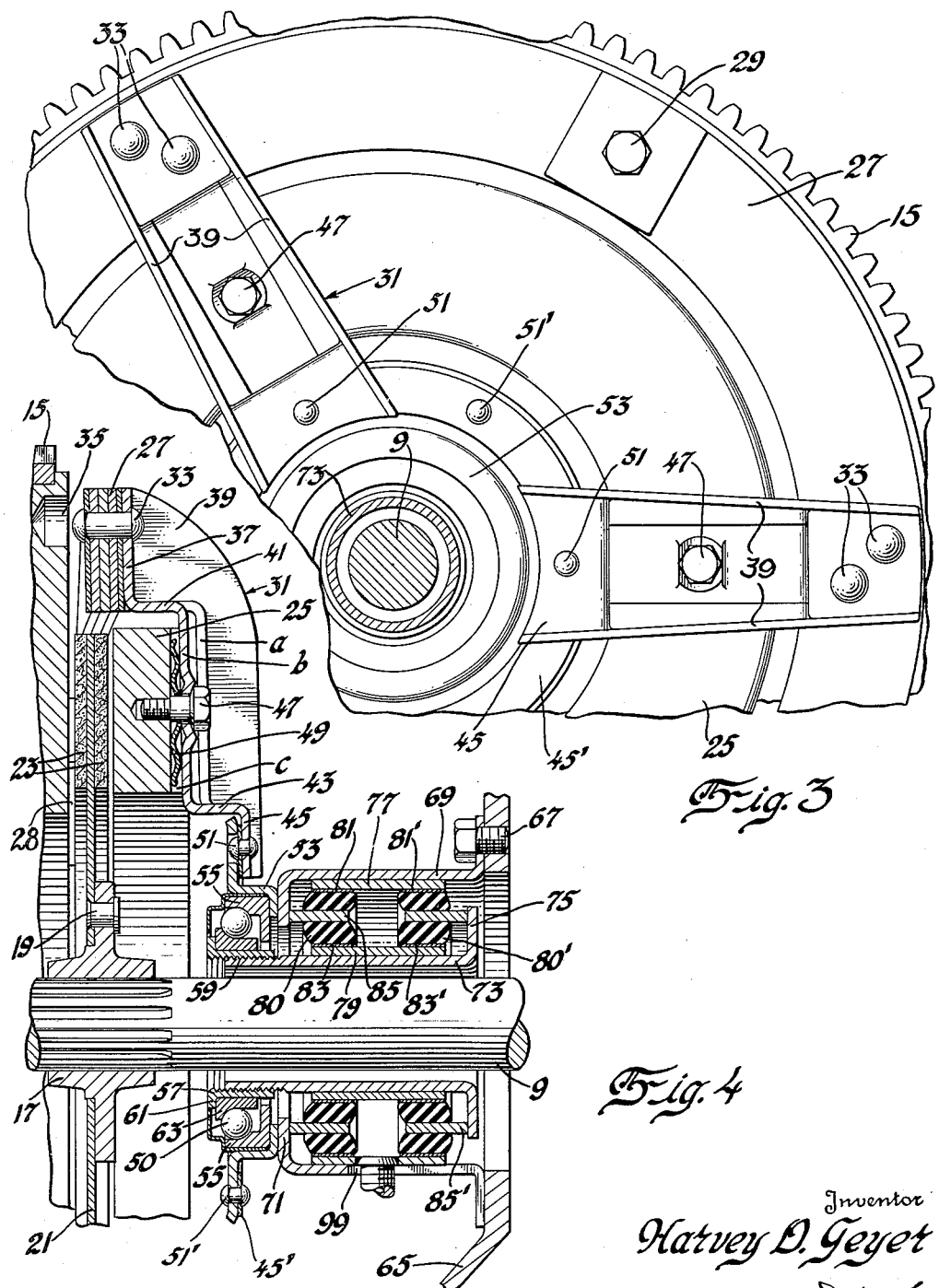

Patented Aug. 10, 1937

2,089,472

UNITED STATES PATENT OFFICE 2,089,472

FRICTION CLUTCH

Harvey D. Geyer, Dayton, Ohio, assignor to General Motors Corporation, Detroit, Mich., a corporation of Delaware Application August 1, 1936, Serial No. 93,751

7 Claims. (Cl. 192—68)

This invention relates to friction clutches and has been designed as an improved clutch for use between the engine and the change speed mechanism of a motor vehicle.

An object of the invention is to provide an efficient clutch wherein many of the parts of the conventional release mechanism are eliminated.

Another object is to provide a very unconventional, efficient and inexpensive spring operable to hold the clutch engaged.

With the novel clutch is shown a novel throwout mechanism, not herein claimed, but made the subject of a separate application Serial Number 91,261, filed July 18, 1936.

In the accompanying drawings illustrating the novel clutch:

Fig. 3 is a view in elevation as seen from line 3—3 of Fig. 1.

Fig. 4 is a horizontal section but showing the parts in changed relation to each other.

Figures 1, 2:
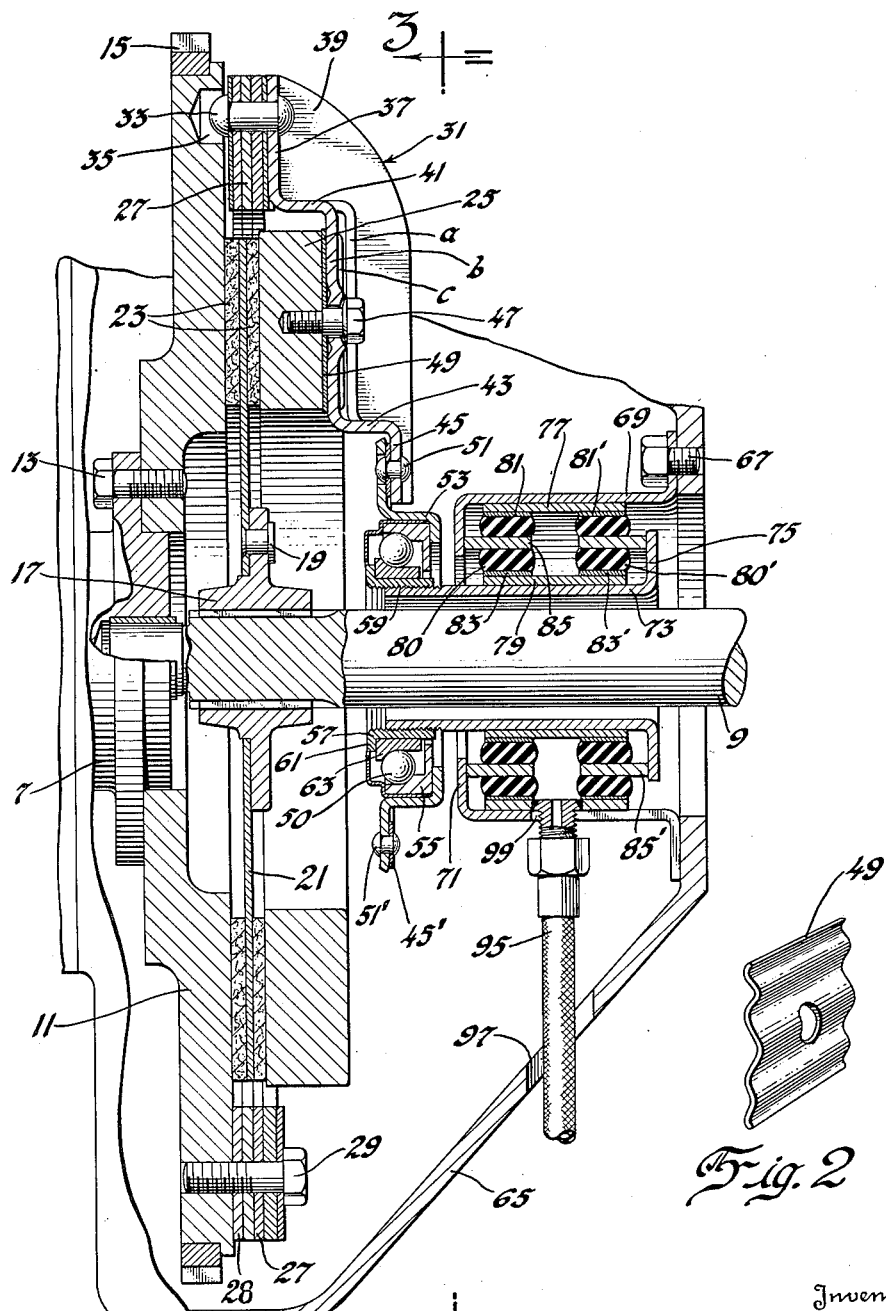
Fig. 1 is a view in horizontal section.
Fig. 2 is a perspective of a detail.

Referring by reference characters to the drawings, numeral 7 represents the crank shaft of the engine of a motor vehicle and 9 the shaft to be clutched thereto, the input shaft of the change speed transmission, not shown. At 11 is the flywheel secured to a crank shaft flange by fastening means 13. As is usual, the flywheel carries a ring gear 15 for engagement with the pinion of the starter motor, not shown. The driven shaft 9 carries a splined hub 17 to which is secured by rivets or the like 19 a driven disc 21 equipped with facings 23 to engage the flywheel and the pressure plate 25.

To exert pressure on the pressure plate to cause the driven plate to be gripped between the flywheel and pressure plate there are a series of superposed annular springs 27 consisting of three leaves in the illustrated embodiment. This spring assembly is normally substantially parallel with the face of the flywheel but is slightly spaced therefrom as shown in Fig. 1. At spaced points these plates are secured to the flywheel by fastening means 29. Spacers 28, which may be of rectangular outline, are located beneath the spring assembly and held by the fastening means 29. These spacers function to hold the spring assembly slightly spaced from the flywheel, as stated above. Numeral 31 designates as a whole the releasing members. One of these releasing members is secured to the springs 27 as at 33 at a point between each pair of adjacent fastening means 29. The flywheel may be recessed at 35 to accommodate the fastening means 33. The releasing members are of U shape in cross section, being formed with flanges 39 and they extend radially from their point of securement 33. At their outer ends the web 37 lies flat against the springs 27. The web 37 is then bent axially as at 41 to an extent commensurate with the thickness of the pressure plate. As it crosses the annular pressure plate the releasing member is depressed as from $a$ to $b$ and the depressed portion is received within a corresponding depression $c$ formed in the pressure plate. By this provision there can be no relative circumferential movement between the pressure plate and the members 31 and, since members 31 are secured to the springs 27 which can have no circumferential movement relative to the flywheel because of fastening means 29, the pressure plate itself rotates with the flywheel.

Radially within the inner edge of the pressure plate the web of the member 31 is again bent axially at 43 and then radially as at 45 to an inner end. A fastening member 47 is extended through the depressed web of the releasing member and is threaded into the pressure plate 25. Its head is rounded to engage a similarly shaped surface adjacent the opening in the web. Between the pressure plate and the overlying web is a spring 49. This spring is shaped as in Fig. 2 when unstressed. Its corrugations are flattened out as in Fig. 1 when the clutch is engaged. In clutch release condition it returns to its original form and tends to bias the pressure plate away from the releasing member. As a result of this flattening of the spring when the releasing member forces the pressure plate into active clutch engaging position, a yielding resistance is offered to the earlier part of the clutch engaging movement whereby a smooth engagement ensues. It will be seen, therefore, that if means be provided to draw part 45 of the releasing member away from the flywheel, the clutch may be released and the omission of such conventional means as fingers pivoted to the clutch housing and engaging the pressure plate not only eliminates many parts but avoids much attendant friction.

To release the clutch there is shown secured at 51 to part 45 a spring ring 45' which is secured at 51' to the flange ring 53 shaped as shown and having an angular region to engage with a press fit the outer race 55 of an antifriction bearing 50. A collar 57 is threaded at 59 and press-fitted therein adjacent a flange 61 thereof is the inner race 63 of said bearing. The clutch is housed in a casing 65 from which shaft 9 extends. Concentrically surrounding the shaft 9 and secured to the housing at 67 is a sleeve 69 having an inner end down-turned flange 71. Another concentric sleeve 73 nearer the shaft 9 has its one end threaded to the collar 57 and its other end formed with a radial flange 75. It is only necessary to reciprocate sleeve 73 with its flange 75 to release the clutch since such reciprocation will move the inner ends of the releasing members 31 and distort the springs 27 from the position shown by Fig. 1 to that illustrated in Fig. 4, this action lifting the pressure plate by means of parts 47.

To accomplish the above reciprocating movement of sleeve 73 a hydraulic motor is used. This motor comprises an outer ring 77 having a sliding fit within sleeve 69, a similar ring 79 slip-fitted on the outer surface of sleeve 73 and means forming a variable volume chamber between these rings. Spaced outer rings 81 and 81', spaced inner rings 83, 83', and spaced intermediate rings 85, 85' carry a plurality of deformable rings as of rubber 80, 80'. These rings are vulcanized to the rings 85, 85', 81, 81', and 83, 83'. The rings 81, 81' are normally too great in diameter to enter ring 77 and rings 83, 83' are normally too small in diameter to embrace ring 79. To assemble the parts the distance between the outer and inner rings is reduced by pressure so that when assembled the rubber is axially extended by radial compression. When assembled the ring 85 engages the flange 71 of sleeve 69 and the ring 85' engages the flange 75 of sleeve 73. Hydraulic medium under pressure from a suitable master cylinder which is not shown but may be like the master cylinder of a hydraulic brake system is delivered to the chamber between the opposed rubber rings through a suitable conduit 95, the conduit passing through an opening 97 in the casing 65, through a slot 99 in the fixed sleeve 69 and secured in any convenient way to the ring 77. The introduction of the fluid medium causes the chamber to increase in size and part 85' moves the sleeve 73 and releases the clutch. In this action the engagement of 85 with the fixed sleeve 69 necessarily results in all the actual movement being at the other end. The stressing of the rubber of the several rings 80 and 80' is, however, equalized owing to the manner of securement and the slip fit of the outer rings.

When the fluid pressure becomes effective, part 73 is moved to the right (Fig. 1). Since the spring assembly is secured at spaced points 29 and since the members 31 are clamped to the spring assembly at 33 midway between points 29, the leaves are twisted so that their planes are no longer parallel with the flywheel. This twisting is facilitated by the normal spacing of the springs from the flywheel by the spacers 28.

I claim:

1. In a clutch, a flywheel, a driven plate and a pressure plate, annular spring means secured to said flywheel at spaced circumferential points, said springs normally spaced slightly from said flywheel, releasing members secured to said spring means between its points of securement extending radially therefrom and connected to said pressure plate, and means to move the radially inner ends of said members away from said flywheel and distort said springs from parallelism with said flywheel between said points of securement.

2. The invention defined by claim 1, said pressure plate and releasing members having inter-engaging parts whereby said pressure plate rotates with said flywheel.

3. The invention defined by claim 1 together with springs between said pressure plate and said releasing members biasing said parts to spaced relation.

4. The invention defined by claim 1 together with normally corrugated springs between said pressure plate and releasing members to bias said parts to spaced relation and adapted to be flattened when the releasing members operate under the influence of the annular spring means to move the pressure plate to clutch engaging position.

5. The invention defined by claim 1, said spring means comprising a plurality of superposed leaves.

6. In a clutch, a driving shaft having a flywheel, a driven shaft carrying a driven plate adjacent said flywheel, annular spring means secured at spaced circumferential points to said flywheel, radial arms terminally secured to said spring means between said points of securement and extending to inner ends adjacent said driven shaft, a pressure plate secured to radially intermediate parts of said radial arms and adapted under the influence of the annular spring means to move said pressure plate axially in one direction to grip the driven plate between itself and the flywheel, and means to move said inner ends in the opposite axial direction to move said pressure plate away from the flywheel against the action of said spring means.

7. The invention defined by claim 6 together with other spring means between said pressure plate and radial arms to bias said pressure plate away from said arms and to provide soft reengagement after release.

HARVEY D. GEYER.